United States Patent [19]

Buhl

[11] Patent Number: 4,883,263
[45] Date of Patent: Nov. 28, 1989

[54] MOLECULAR JOINT FOR AXLE STRUTS AND CONNECTING RODS AND SIMILAR PARTS OF MOTOR VEHICLES

[75] Inventor: Reinhard Buhl, Bohmte, Fed. Rep. of Germany

[73] Assignee: Lemförder Metallwaren AG, Lemförder, Fed. Rep. of Germany

[21] Appl. No.: 191,276

[22] Filed: May 6, 1988

[30] Foreign Application Priority Data

May 8, 1987 [DE] Fed. Rep. of Germany ....... 3715360

[51] Int. Cl.$^4$ .................. B60G 11/18; B60G 7/02; B62D 7/16
[52] U.S. Cl. ................................. 267/293; 267/292; 267/258; 267/279; 267/141; 403/133; 403/140
[58] Field of Search ................... 267/292, 293, 140.5, 267/140.2, 141.3, 141.7, 153, 257, 258, 228, 284, 279, 281, 276; 403/133, 132, 140, 135

[56] References Cited

U.S. PATENT DOCUMENTS 3,685,772  8/1972  Giaccone ........................... 267/153
4,564,307  1/1986  Ito ..................................... 403/133

FOREIGN PATENT DOCUMENTS 502496    6/1930   Fed. Rep. of Germany ... 267/141.7
2831470   1/1980   Fed. Rep. of Germany ...... 403/133
0188712   11/1983  Japan ................................... 403/140
338658    7/1959   Switzerland ......................... 403/140

Primary Examiner—Andres Kashnikow
Assistant Examiner—Mark T. Le
Attorney, Agent, or Firm—McGlew & Tuttle

[57] ABSTRACT

A molecular joint for axle struts, connecting rods, and similar parts of motor vehicles comprising a substantially cylindrical housing having a joint pivot lying approximately in the middle axis of the housing, and a sleeve-like joint body of an elastomer material, which is arranged between the housing and the joint pivot and adheres to both, with a prestressing. On the inner surface of the housing, there is provided a material recess in a central or middle zone, which reduces the prestress of the sleeve-like joint body in this zone an thereby produces a progressive characteristic of the molecular joint in the direction of loading.

7 Claims, 2 Drawing Sheets

MOLECULAR JOINT FOR AXLE STRUTS AND CONNECTING RODS AND SIMILAR PARTS OF MOTOR VEHICLES

BACKGROUND OF THE INVENTION

Field of the Invention

This invention relates, in general, to pivotal joint constructions and, in particular, to a new and useful molecular joint for motor vehicle parts, such as axle struts and connecting rods and which has an elastomer material arranged between the housing and the joint pivot under prestressing and which further includes a recess defined on the interior surface of the housing which provides an improved operation in the direction of loading.

A similar pivotal joint is known from German patent 33 12 090. The convention is to fashion the joint body as a cylindrical sleeve, but this patent declares a configuration in which the joint body on either side of a plane lying in the principal direction of loading has approximately the same height of material between the housing and the pivot, measured in the direction of loading. In this way, a more uniform distribution of the load in the material of the joint body, and, thus, a more uniform surface pressure is achieved. Recesses about the periphery of the elastomer joint body of a molecular joint are known from U.S. Pat. No. 3,147,964, although extending only over a partial region, so that the spring characteristic of the joint body is reduced in this region and different spring characteristics for the section are achieved.

Molecular joints are maintenance-fee, resistant to dirt, salt water, road stoning, etc., and therefore are preferable in the design of trucks, construction vehicles, or the like, especially in the design of buses, due to the precise axle steering and the enhanced driving comfort.

SUMMARY OF THE INVENTION

The invention provides a joint with a spring characteristic that is progressively variable under increasing load, especially in the principal direction of loading, while retaining all the advantages of a molecular joint.

Accordingly, it is an object of the invention to provide a molecular joint for axle struts, connecting rods and similar structures of motor vehicles which comprises a hollow housing having a substantially cylindrical interior surface with a joint pivot in the housing arranged substantially in the central portion of the housing and a sleeve-like joint body of elastomer material which is arranged between the housing and the joint pivot and adheres to both a under a pre-stressing and which includes at least one recess on the interior surface of the housing a middle zone which reduces the prestress of the sleeve-like joint body of elastomer material in this zone.

These features lead to a soft springing and shock absorption at low amplitude in the region of noise-generating frequencies under small load and a hard characteristic under high loads, e.g., by braking and/or drive forces, as well as jolts from lateral, lengthwise or vertical forces while driving, with precise axle steering at the same length.

The material recesses stipulated by the invention result in an essentially radial reduction in the prestress of the elastomer material of the joint body in the installed state, while the material of the joint body nevertheless can lie almost entirely against the inner contour of the housing, or instead exert only partial contact on the surfaces of the material recess. Under small load, bearing forces are transmitted only to the ends of the joint body. With increasing radial load, the supporting component of the joint increases, so that the spring resistance also grows. This progressive spring characteristic of the joint body of elastomer material theoretically corresponds to a parallel engagement of several springs, in which a new spring takes up a portion of the load after each particular spring distance is covered.

The Cardan characteristic and the torsion characteristic are only negligibly reduced by these recesses. For the Cardan characteristic, the supporting elements of the marginal zones of the joint are the most significant, and these are only slightly diminished by the recess. For the torsion characteristic, shear stresses within the elastomer material are decisive. These are only slightly lessened.

For axle struts and connecting rods, which essentially brace against lengthwise forces only, the recess can be made radial about the periphery, for example, by lathe machining. The radial elasticity present transverse to the load cannot be increased. The recess can be made as a free turning with sideways arranged bezels, so that the transition to the marginal zone is steplike, or with a continuous transition from the recess to the marginal zone of the housing or even of the pivot. For use in conjunction with a triangular connecting rod, the required radial characteristic can be different in the transverse and lengthwise directions. The recess in such cases can be made in only one desired direction, for example, by milling, so that the material recesses extend only over a partial region.

A further object of the invention is to provide a pivotal joint which includes an elastomer material bonded between a pivot and a housing under stress and which includes a relief area defined in the interior of the housing between the elastomer material and the housing.

A further object of the invention is to provide a pivot joint which is simple in design, rugged in construction and economical to manufacture.

GENERAL DESCRIPTION OF THE PREFERED EMBODIMENTS

Figure 1:
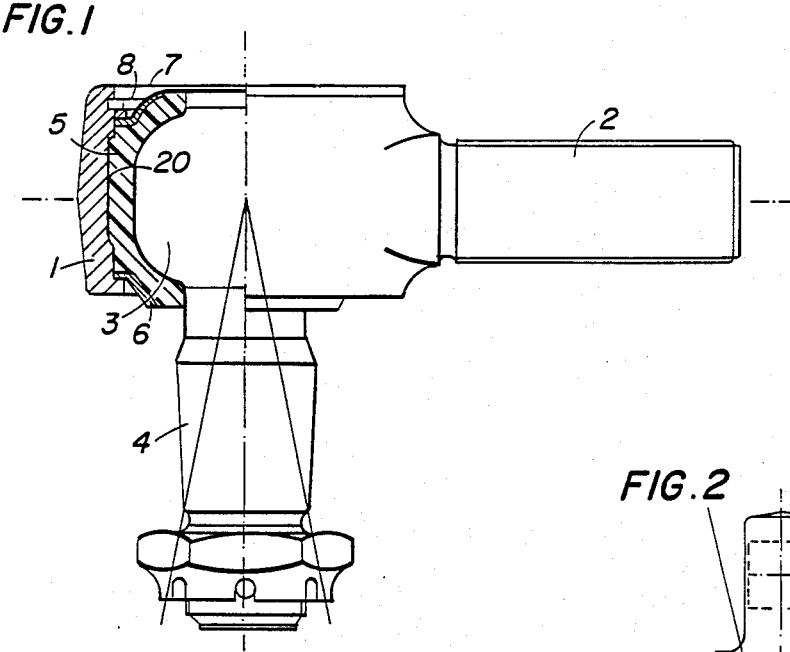
FIG. 1 is a partial section of a molecular joint having a conical pivot and constructed in accordance with the invention.
Figure 2:
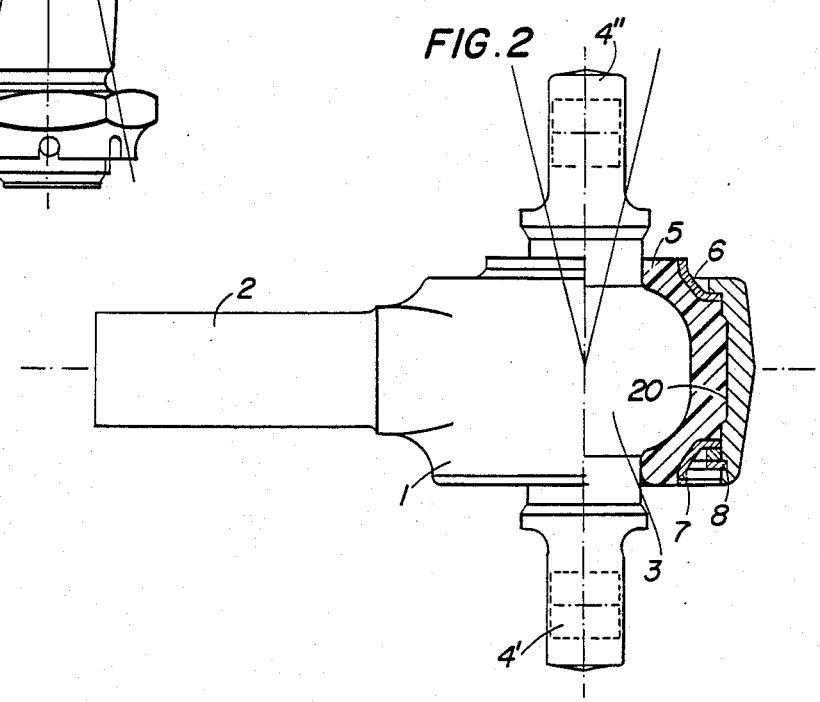
FIG. 2 is a partial section of a molecular joint with fastening flange at either end of another embodiment.
Figure 3:
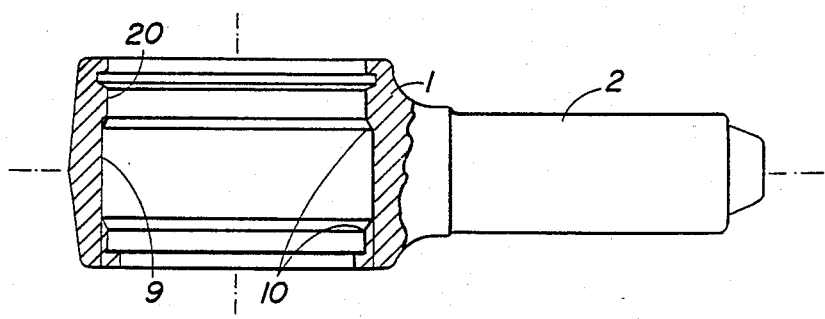
FIG. 3 is a lengthwise section through the housing without the pivot or the joint body.
Figure 5:
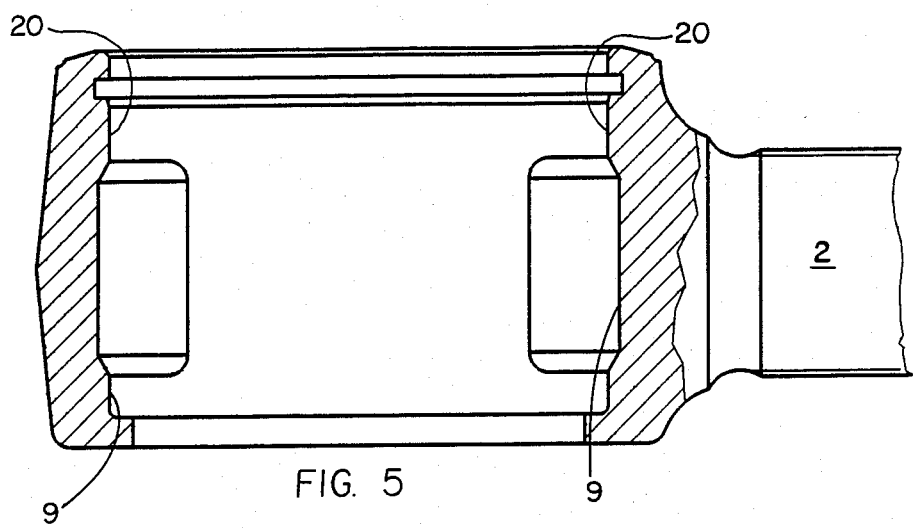
FIG. 5 is a sectional view of the molecular joint taken along the line 5—5 in FIG. 4.
Figure 4:
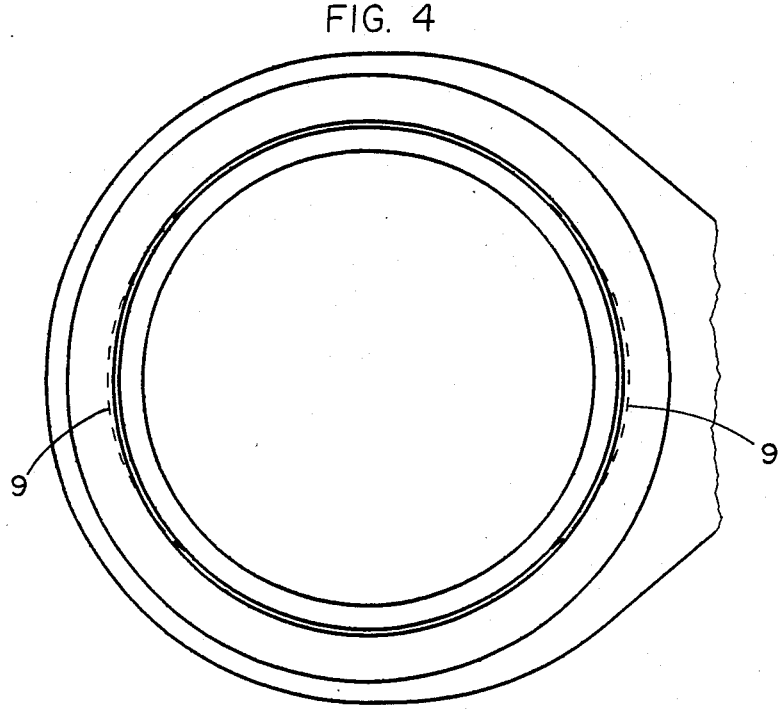
FIG. 4 is a top plan view of a molecular joint housing with recesses extending over opposite partial regions.

Referring to the drawings, in particular, the invention embodied therein comprises a molecular joint for axle struts, connecting rods and similar parts of motor vehicles and which includes a hollow housing which is formed at the end of a part, such as a fastening pivot 2 and which has an interior surface 20 which, in each embodiment of the drawings of FIGS. 1-3, has an area with a material recess 9 which is in a central portion or middle area of the interior surface 20. This recess 9, together with the chamfered transition 10, provides an improved operation of a joint pivot 3 which is contained within the housing between the interior surface 20 and an elastomer material or sleeve-like element or joint body 5 of elastomer material.

The molecular joint in the example of FIG. 1 comprises a metallic housing 1 with an outer fastening pivot 2, a joint pivot 3 with fastening parts 4' and 4" and a joint body 5 of elastic material. The example of FIG. 2 has the fastening parts 4' and 4" at both sides for connection with a flange or the like in a so-called claw joint. The supporting region of the joint pivot 3 in both examples is rounded, e.g., spherical, or cylindrical in the middle with rounded sections adjoining each side. At the two end faces of the elastomer joint body 5, there are supporting rings 6 and 7, of which one thrusts against an inner shoulder of the housing 1 and the other is retained by a snap ring 8, inserted during the installation of the joint.

In order to implement the concept of the invention, the housing 1 in the example configuration is provided with a material recess 9 on the inside in the region of a zone extending at either side of the middle radial plane through the housing. This material recess in the example shown passes symmetrically around and grades into the cylindrical region of the inner housing surface with side bezels 10, which thrust against the marginal zones of the joint body 5 of elastomer material. To clarify this configuration, FIG. 3 shows a lengthwise section through the housing 1 without the joint pivot or the joint body. Instead of the chamfered transition 10, a continuous transition may be formed, as already mentioned. Furthermore, the material recess 9 in adaptation to specific regulating loads of the joint after subsequent installation can also be situated in a region extending partly about the periphery. In the examples shown, the joint body 5 is firmly joined to the joint pivot 3 by vulcanization. The firm joint between the joint body and housing is made during the installation of the joint and is therefore produced by friction. Other variations, depending on the state of the art, are possible.

While specific embodiments of the invention have been shown and described in detail to illustrate the application of the principles of the invention, it will be understood that the invention may be embodied otherwise without departing from such principles.

What is claimed is:

1. A molecular joint for axle struts, connecting rods, and similar parts of motor vehicles comprising:

a hollow housing having a substantially cylindrical interior surface;
   a substantially ball-shaped joint pivot in said housing lying roughly along a middle axis of said housing;
   a sleeve-like joint body of elastomer material arranged between said housing and said joint pivot and adhering to said housing and to said joint pivot under a prestressing;
   said interior surface defining a top portion, a bottom portion, and a middle portion;
   said interior surface including a first end wall arranged at a first distance from said middle axis and a second end wall arranged at a second distance from said middle axis, said second end wall being further away from said middle axis than said first end wall, said first end wall occupying said top portion and said bottom portion of said interior surface, and said second end wall located in said middle portion of said interior surface;
   a first joint body portion being between said first end wall and said joint pivot providing said joint body with a first prestressed region, a second joint body portion being between said second end wall and said joint pivot providing said joint body with a second prestressed region, said first pre-stressed region being substantially more prestressed than said second prestressed region so that small radial loads are transmitted to the first prestressed region and large radial loads are transmitted to the second prestressed region.

2. A molecular joint according to claim 1, wherein the second wall occupies symmetrically opposite areas of said interior surface.

3. A molecular joint according to claim 1, wherein said second wall occupies substantially all of the middle portion of said interior surface.

4. A molecular joint according to claim 1, wherein said first end wall grades to said second end wall along a bezel.

5. A molecular joint according to claim 1, wherein said first end wall grades continuously to said second end wall.

6. A molecular joint according to claim 1, further comprising a top supporting ring located between said interior surface top portion and said first joint body portion for supporting said joint body at a top edge and a bottom supporting ring located between said interior surface bottom portion and said first joint body portion for supporting said joint body at a bottom edge.

7. A molecular joint according to claim 6, wherein said bottom supporting ring is retained by a snap ring, said snap ring fitting over said bottom supporting ring.

* * * * *